May 29, 1923.

M. M. KOHN

ELECTRICAL HEATING DEVICE

Filed Jan. 28, 1921

Inventor:
Milton M. Kohn,
by Wolfe Moses
Att'ys.

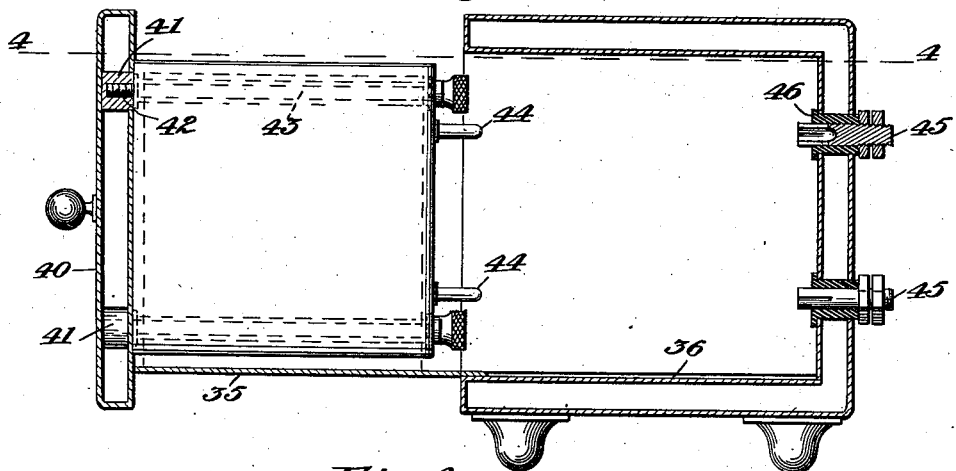
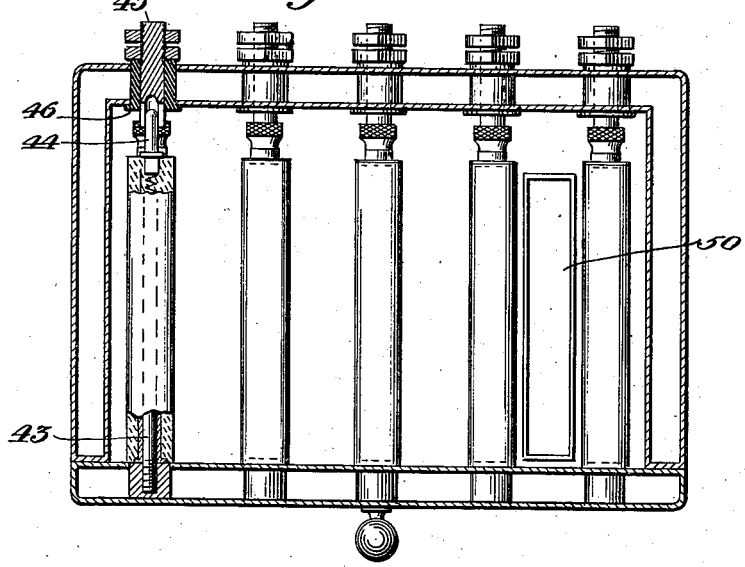

May 29, 1923.

M. M. KOHN

ELECTRICAL HEATING DEVICE

Filed Jan. 28, 1921

Inventor:
Milton M. Kohn,
by Wolfe Thoses
Att'ys.

Patented May 29, 1923.

1,456,878

UNITED STATES PATENT OFFICE.

MILTON M. KOHN, OF NEW YORK, N. Y.

ELECTRICAL HEATING DEVICE.

Application filed January 28, 1921. Serial No. 440,641.

*To all whom it may concern:*

Be it known that I, MILTON M. KOHN, a citizen of the United States, residing at New York, in the county of New York and State of New York, have invented certain new and useful Improvements in Electrical Heating Devices, of which the following is a specification.

This invention relates to portable electric heating and cooking devices, and particularly such as may be used for toasting bread and cooking other articles of food.

In general my device consists of a casing consisting preferably of heat insulating walls surrounding a series of easily detachable and removable and interchangeable heating units, the space between the heating units being occupied by the material to be cooked, for example, a slice of bread or a receptacle containing a beverage, whereby the food or beverage is heated upon both sides, which comprise a very great part of the area. As a result of my structure the slice of bread or beverage or other material, receiving heat over practically its entire surface, requires less intensity of heat in the heating element. In fact, good results may be produced with the intensity so low that the heating element while functioning does not glow and by reason thereof a very low priced resistance and, hence, low priced heating unit may be used.

While in most devices of this type expensive resistance alloys are required, in my device I may use either such alloys or ordinary iron wire, or in fact any other desired resistance material, as it will last a great length of time, due to the fact that it is not necessary to heat it to a glowing temperature.

The drawings show two embodiments of my invention which are merely illustrative thereof. Further modifications may be made without departing from the spirit of the invention, providing the essential features are preserved.

Fig. 1 of the drawing is a vertical longitudinal section of one form of construction.

Fig. 3 is a longitudinal vertical section of a different form of construction.

Fig. 4 is a sectional plan thereof on line 4—4 of Fig. 3.

Figure 1:
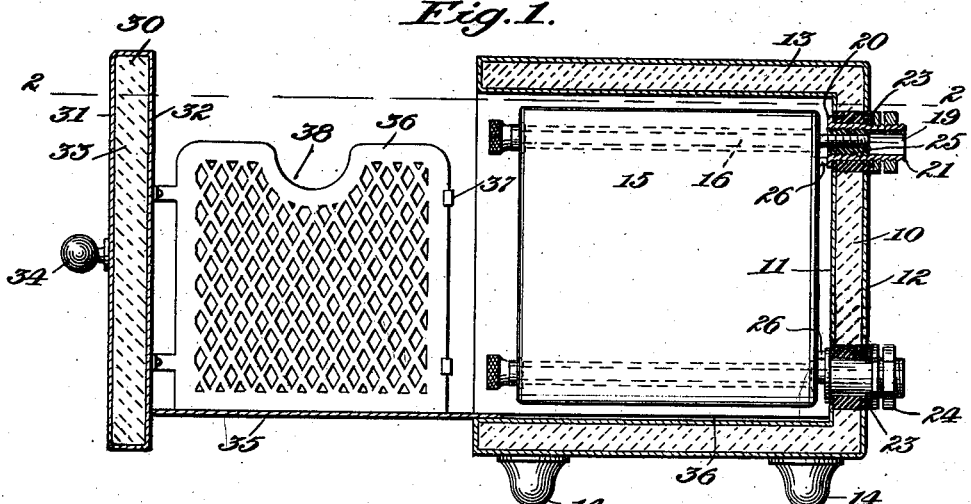
Figure 2:
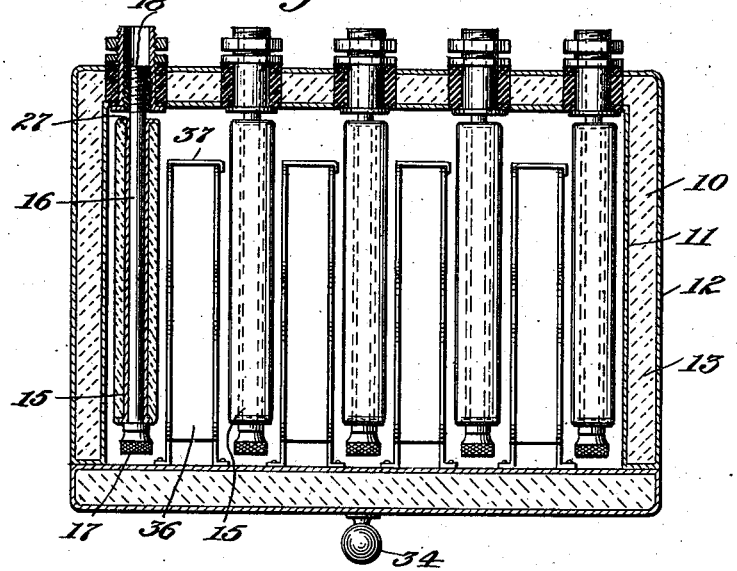
Fig. 2 is a sectional plan view thereof on line 2—2 of Fig. 1.

Referring to Figs. 1 and 2, 10 is a double walled casing consisting of an internal wall 11 and an external wall 12 having insulating material 13 therebetween, the casing being mounted if desired on suitable supports 14. The size and form of the casing may be such as is found most desirable, but in general I prefer that the interior width and depth be such as to accommodate an ordinary slice of bread or other articles as it may be desired to cook simultaneously. Within the casing are the desired number of heating units 15, which may be of any structure but preferably consist of a cheap resistance material embedded in a suitable plastic composition, which may be such as is described in my co-pending application Serial No. 447,122, filed Feb. 23, 1921. Since I do not herein claim the structure of said heating element per se I deem it unnecessary to further describe the same other than to state that this element has attached thereto suitable means for attaching it removably and interchangeably within the casing and means for completing the electric circuit.

In this particular embodiment of the invention the units may have suitable supporting pins 16 passing therethrough, such supporting pins 16 having knurled heads 17 at one end and screw threads 18 at the other, the elements being supported between these heads and screw threads. A wall, for example that to the right of Fig. 1, is provided with suitable perforations through which pass electrically conducting sleeves 19, each having a flange 20 at one end and screw threads 21 at the other. These sleeves fit within the aforesaid openings, suitably insulated therefrom, as by a sleeve 22 of insulating material. A nut 23 binds the sleeve in position in the wall and a second nut 24 holds the electrical lead (not shown) in electrical contact with the nut 23, thereby conducting current to the sleeve 19. The screw threaded end 18 of the pin 16 is held fast within a sleeve 25 of insulating material, which in turn is held fast within the sleeve 19 by suitable means, such as screw threads. Suitable contacts 26 projecting from the heating elements and connected to the terminals of the unit make a pressure contact with the sleeves 19, as shown, and this contact may be increased by screwing in the pin 16 by means of the knurled head 17.

In order to remove or replace any of these heating elements, it is sufficient to give the knurled heads 17 thereof a few turns, whereupon the pins together with the element may be removed bodily from the rest of the device, and a heating element may be operatively inserted with the same facility.

To facilitate movement of the pin within the heating element, the latter may be provided with suitable tubes 27 embedded therewithin, through which the pin 16 may easily slide.

The front of the casing is open and adapted to be closed by a closure element 30, which also may consist of two walls 31 and 32 having between them suitable insulating material 33 and for convenience a handle 34. Said closure element is provided with food supporting members, so that the various articles of food or beverage are placed within the device by the mere closing of the closure element. Suitably attached to the closure element 30 is a plate 35, which is adapted to slide within a groove 36 of the casing 10. Suitably supported upon the door and member 35 are the supporting members 36, which may consist of any suitable supports for the sides of the article, but preferably are made of expanded metal, as shown. Two of these are located between each two heating elements, spaced apart to accommodate the bread, beverage container or the like, and connected to each other at the inner end by elements 37, the assemblage forming a sort of cage into which the article may be introduced and supported very close to but out of contact with the heating element. Suitable notches 38 may be provided to facilitate removal or introduction of the article to be cooked. The form of construction illustrated in Figs. 3 and 4 is, in general, similar to that just described.

If desired, the casing, which also has double walls, may be made air tight and evacuated, or air may be used as the insulating medium.

In the embodiment illustrated on Figs. 3 and 4 the heating elements are attached to and movable with the closure member, and serve as supports for the article of food or container which is to receive the heat therefrom.

The door 40, which may be double walled like the container, is provided with bosses 41 suitably screw threaded to receive the screw threaded ends 42 of the pins 43, upon which pins the heating elements are supported as in the form of construction previously described. This door also has a plate 35 sliding within the groove 36, as in the other embodiment. The heating elements have projecting terminals 44, which may be of the split pin or other suitable type, and which register and make contact with terminals 45 insulatedly retained in the rear wall of the casing by the sleeves 46.

It will thus be apparent that by means of this modification the positioning of the closure element to close the opening will suitably place the material to be heated, and at the same time make electrical contact between the heating units and the terminals upon the casing.

Figure 5:
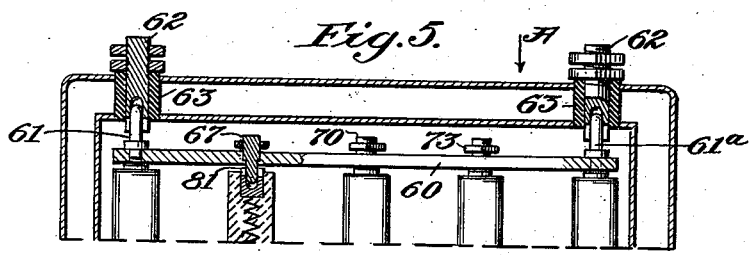
Fig. 5 is a sectional view of a modification of my device.
Figure 6:
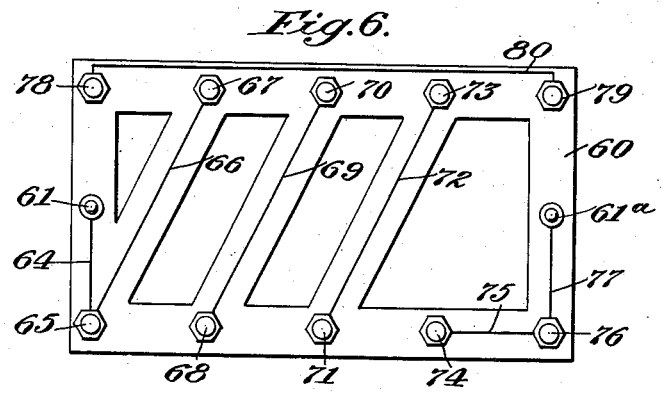
Fig. 6 is a view of one side of the assemblage and wiring plate viewed in the direction of the arrow A on Fig. 5.
Figure 7:
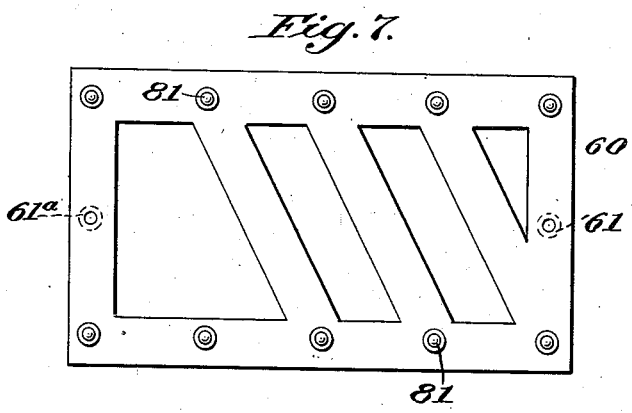
Fig. 7 is a view of the opposite side of said plate.

In Figs. 5, 6 and 7 I have illustrated a modification in which the heating units are suitably attached to an assemblage and wiring plate 60. This plate is provided with suitable electrical contacts 61 and 61$^a$, which register with corresponding insulated contacts 62 retained in the casing wall by means of insulated sleeves 63, and which serve as terminals for the completed device. Plate 60 is preferably perforated.

On the side of the plate opposite that provided with the contacts 61 and 61$^a$ are a number of fixed contacts which pass through the plate to form removable contacts and supporting means for the heating units. By means of this arrangement any one or more of the heating units may be removed from the assembled device, or all the units together with the assemblage and wiring plate may be removed as a whole. This modification has certain advantages over those previously described, namely, that upon insertion of the assembled heating units and plate into the casing only two sets of contact need register, which greatly facilitates accurate insertion of the heating parts.

In devices of this type the centre will become considerably hotter than the ends when each unit generates the same amount of heat; accordingly I prefer to cause each of the two outside units to generate more heat than any of the inside units. This may be accomplished by various methods, that which I prefer being to divide the heating circuit into more than one circuit, and preferably by having the outside units in one circuit and the other units in another circuit which has a greater resistance than the first mentioned circuit. A preferred method of accomplishing this is as follows.

The contact 61 is connected by means of a wire 64 with the contact or binding post 65, which in turn is connected by means of the wire 66 with the binding post 67. A binding post 68 is opposite binding post 67 and is connected by means of the wire 69 to the binding post 70. Binding post 71 is opposite binding post 70 and is connected by means of wire 72 to the binding post 73, opposite which is the binding post 74 connected by means of the wire 75 to the binding post 76, and this is connected by means of the wire 77 to the contact 61ª.

Opposite binding post 65 is a binding post 78 and opposite binding post 76 is a binding post 79; posts 78 and 79 are connected together by means of a wire 80.

All the above mentioned binding posts are located on the same side of plate 60, and connected to each binding post there is a quick detachable contact 81 projecting from the other side of said plate.

The heating units are provided with contacts to register with contacts 81, and are arranged upon the plate 60 by locating them across the pairs of opposite contacts. This will cause a division of the circuit, so that the current entering at 61 will flow through wires 64 and 66 to the binding post 67, through a heating unit to the binding post 68, then through the wire 69 and binding post 70, then through another heating unit to the binding post 71, through wire 72 to the binding post 73, and through another heating unit to the binding post 74, and then on and out through contact 61ª. The other circuit will branch off at the binding post 65 and pass through a heating unit to the binding post 78, then through wire 80 to the binding post 79, then through another heating unit to the binding post 76, and then through wire 77 to the contact 61ª.

In any modification the slice of bread or vessel 50 containing beverage or the like is suitably heated from practically all sides.

I claim:

1. An electrical heating device comprising a casing, quickly removable, replaceable and interchangeable heating units, quick detachable connectors each comprising two parts, one of which is removable with the heating units and the other of which is attached to the casing and constitutes a terminal.

2. An electrical heating device comprising a casing, a part of a quick detachable connector on said casing and constituting a terminal, a removable, replaceable and interchangeable heating unit, another part of a quick detachable connector attached to said heating unit and corresponding to said first mentioned part.

3. An electrical heating device comprising a casing, parts of two quick detachable connectors on said casing and constituting terminals, a removable plate, two parts of quick detachable connectors, corresponding to said first mentioned parts, on said plate, a series of connector parts on said plate, a series of heating units each having a connector part corresponding to those of said series, and electrical connections on said plate.

4. In an electric heating device of the type described, a double walled heat insulated casing, quick-detachable electrical heating units electrically attached conductively within said casing to a wall thereof, one side of said casing being open and adapted to be closed when operative by an insulated double walled door mounted on a plate horizontally slidable in said casing, said plate being provided with racks for supporting the material to be heated.

5. In an electric heating device of the type described, a casing having internal and external walls insulated from each other, a double walled insulated element forming a closure for said casing and closing an electric circuit when in the closed position, said closure being mounted on a plate horizontally slidable in said casing, electrical heating units mounted on said plate, terminals in said heating units registering with terminals in the rear wall of said casing to close the circuit, said horizontal slidable plate forming the supports for the material to be heated.

6. An electrical heating device comprising a casing, a multiplicity of heating units within said casing so arranged as to leave heating spaces between said units, and means to cause each of the outer units to generate more heat than each of the intermediate units.

7. An electrical heating device comprising a casing, a multiplicity of heating units within said casing so arranged as to leave heating spaces between said units, the outer units being connected in one circuit, intermediate units connected in another circuit, the resistance of the first mentioned circuit being less than that of said second mentioned circuit.

8. An electrical heating device comprising a casing, a multiplicity of heating units within said casing so arranged as to leave heating spaces between said units, electrical terminals on said casing, a distributing and supporting plate, quick-detachable connections between said plate and said terminals, electric connections from said quick-detachable connections comprising two circuits, one of said circuits including the outer heating units and the other circuit including intermediate heating units.

9. An electrical heating device comprising a casing, a multiplicity of heating units within said casing so arranged as to leave heating spaces between said units, electrical terminals on said casing, a distributing and supporting plate, quick-detachable connections between said plate and said terminals, electric connections from said quick-detachable connections comprising two circuits, one of said circuits including the outer heating units and the other circuit including intermediate heating units, the second mentioned circuit including more heating units than the first mentioned circuit.

10. In an electrical heating device of the type described, a double walled heat insulated casing, quick detachable electrical heating units electrically attached within said casing to a wall thereof, one side of said casing being open and adapted to be closed when operative by an insulated double walled door mounted on a plate slidable in said casing, said plate being provided with racks for suporting the material to be heated.

11. In an electric heating device of the type described, a casing having internal and external walls insulated from each other, a double walled insulated element forming a closure for said casing and closing an electric circuit when in the closed position, said closure being mounted on a plate slidable in said casing, electrical heating units mounted on said plate, terminals in said heating units registering with terminals in the rear wall of said casing to close the circuit, said plate forming the supports for the material to be heated.

In testimony whereof I affix my signature.

MILTON M. KOHN.